United States Patent [19]
Shimotoyodome et al.

[11] Patent Number: 5,751,392
[45] Date of Patent: May 12, 1998

[54] PROCESS FOR FILLING LIQUID CRYSTAL BY GRADUALLY EASING THE LEVEL OF NEGATIVE PRESSURE

[75] Inventors: Gyo Shimotoyodome; Isao Sugiura, both of Tokyo, Japan

[73] Assignee: Beldex Corporation, Tokyo, Japan

[21] Appl. No.: 613,116

[22] Filed: Mar. 8, 1996

[30] Foreign Application Priority Data

Mar. 23, 1995 [JP] Japan .................................. 7-090183

[51] Int. Cl.⁶ .......................... G02F 1/13; G02F 1/1341; B65B 31/00; B67C 3/00
[52] U.S. Cl. ...................... 349/187; 349/189; 141/7
[58] Field of Search ........................ 349/187, 189; 141/7

[56] References Cited

U.S. PATENT DOCUMENTS

| | | | |
|---|---|---|---|
| Re. 34,690 | 8/1994 | Carrington | 349/189 |
| 3,701,368 | 10/1972 | Stern | 349/189 |
| 4,753,276 | 6/1988 | Inaba et al. | 141/7 |
| 5,477,349 | 12/1995 | Fujiwara | 349/189 |

FOREIGN PATENT DOCUMENTS 64-37529   2/1989   Japan.

Primary Examiner—William L. Sikes
Assistant Examiner—Walter Malinowski
Attorney, Agent, or Firm—Fish & Richardson P.C.

[57] ABSTRACT

One end of a vacuum evacuation passage is connected to a suction port of a cell and one end of a liquid crystal supply passage is connected to an introduction port of the cell. In that state, an internal space of the cell is evacuated through the vacuum evacuation passage and the suction port. Thereafter, a pressurized liquid crystal is supplied to the internal space of the cell through the liquid crystal supply passage and the introduction port while evacuating the internal space of the cell. After the completion of a liquid crystal filling operation to the internal space of the cell, the supply of the pressurized liquid crystal is stopped and the level of the negative pressure in the vacuum evacuation passage is gradually eased to the level of the atmospheric pressure.

4 Claims, 2 Drawing Sheets

PROCESS FOR FILLING LIQUID CRYSTAL BY GRADUALLY EASING THE LEVEL OF NEGATIVE PRESSURE

BACKGROUND OF THE INVENTION

This invention relates to a process for filling a liquid crystal in a cell.

In order to facilitate a filling of liquid crystal in a cell, the cell is formed with an introduction port and a suction port. According to a process as disclosed in Japanese Patent Application Laid-Open No. 37529/89, a vacuum evacuation passage and a liquid crystal supply passage are connected respectively to an introduction port and a suction port through connectors. An internal space of a cell is evacuated through one of the connectors and the vacuum evacuation passage, and a liquid crystal is introduced in its pressurized state into the internal space through the other connector and the liquid crystal supply passage. This process can successfully avoid the adhesion of liquid crystal over a wide range of area. It is also possible for this process to reliably carry out the operation of filling a liquid crystal in a short time.

According to the teaching of the above-mentioned process, at the time point of the completion of a liquid crystal filling operation, the pressure level of the liquid crystal is higher in an area in the vicinity of the introduction port than that of the atmospheric pressure and a gap between two substrates, which constitute the cell, is larger than in a normal state. On the other hand, in an area in the vicinity of the suction port of the cell, the pressure of the liquid crystal is lower than that of the atmospheric pressure due to evacuation and the gap between the two substrates is smaller than in a normal state. There is no description about how to cope with the state of the cell at the time point of the completion of a liquid crystal filling operation in the above Laid-Open Publication.

If the pressure in the vacuum evacuation passage connected to the suction port should be returned abruptly to the level of the atmospheric pressure immediately after the completion of the filling operation, air would enter the interior of the cell from the suction port.

If, after the completion of the filling operation, the vacuum state of the vacuum evacuation passage which is connected to the suction port should be maintained until distortion of the substrates has been disappeared and the liquid crystal pressure has been equalized over the entire range of the cell, it would not give rise to such an inconvenience that air enters the interior of the cell from the suction port. In that case, however, another inconvenience would be encountered in which the liquid crystal leaks, little by little, into the vacuum evacuation passage from the suction port. Moreover, disappearance of the distortion of the substrates would be delayed due to the suction port evacuated.

SUMMARY OF THE INVENTION

It is an object of the present invention to provide a process capable of suppressing leak of liquid crystal from a suction port and preventing entry of air into a cell from the suction port after the completion of operation for filling a liquid crystal in the cell.

According to the present invention, there is provided a process for filling a liquid crystal comprising the steps to be performed in the following order of:

(a) connecting one end of a vacuum evacuation passage to a suction port of a cell and further connecting one end of a liquid crystal supply passage to an introduction port of the cell;

(b) evacuating an internal space of the cell by vacuum evacuation means connected to the other end of the vacuum evacuation passage through the suction port;

(c) supplying a pressurized liquid crystal to the internal space of the cell by a pressurized-liquid crystal supply means connected to the other end of the liquid crystal supply passage through the introduction port of the cell while evacuating the internal space of the cell by the vacuum evacuation means;

(d) stopping a supply of the pressurized liquid crystal after the completion of a liquid crystal filling operation into the internal space of the cell; and (e) gradually easing the level of negative pressure in the vacuum evacuation passage to that of the atmospheric pressure by a negative pressure adjusting means which is disposed in the vacuum evacuation passage while maintaining the state of connection between the vacuum evacuation passage and the suction port of the cell.

DETAILED DESCRIPTION OF THE EMBODIMENT

Figure 2:
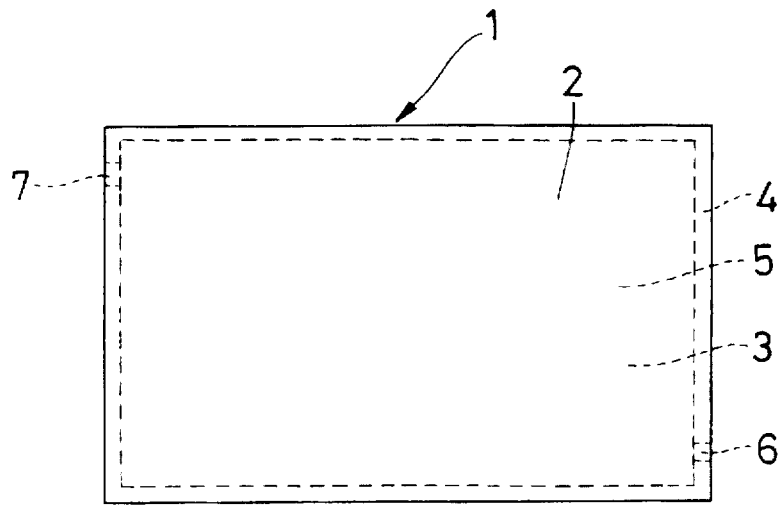
FIG. 2 is a plan view of a cell to be filled with liquid crystal.
Figure 3:
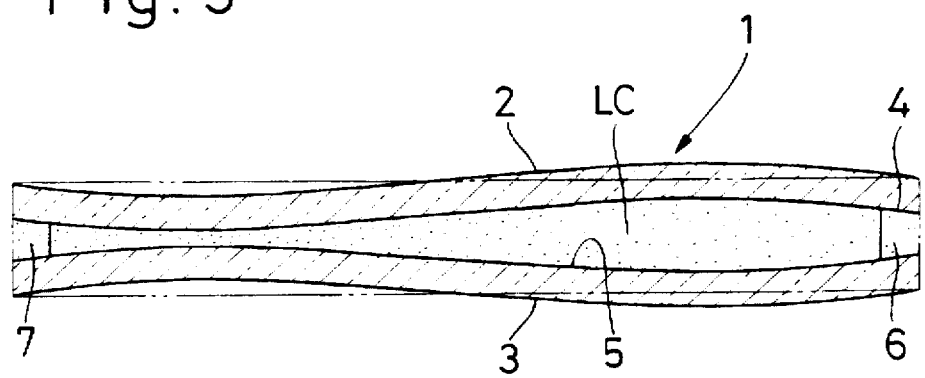
FIG. 3 is an enlarged sectional view showing one stage (i.e., stage immediately after the completion of operation for filling a liquid crystal into the cell) of the process of the present invention, in this Figure, the thickness of each of two substrates of the cell, a gap between the substrates and distortion of the substrates being illustrated in an exaggerated manner.
Figure 4:
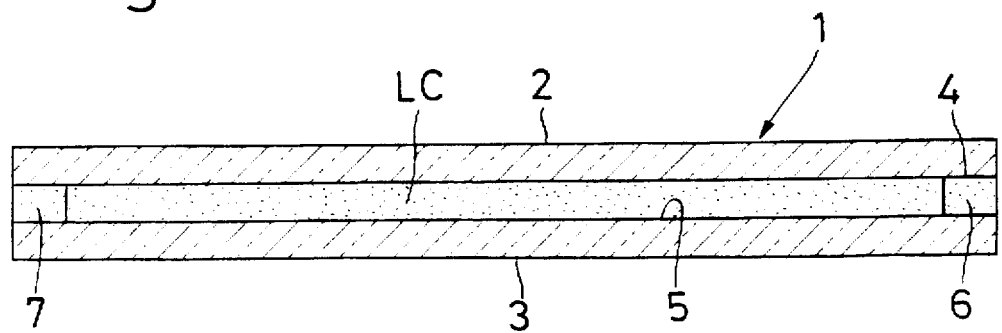
FIG. 4 is a view corresponding to FIG. 3 but showing a final stage (i.e., stage after the passage of a predetermined time from the completion of operation for filling a liquid crystal into the cell) of the process of the present invention.

Before proceeding to the description of a system for carrying out a process of the present invention, a cell will be described. As best shown in FIGS. 2 and 4, this cell 1 includes two rectangular substrates 2 and 3 which are made of transparent material such as, for example, glass. Peripheral edge portions of the substrates 2 and 3 are adhered with each other by an adhesive layer 4. An internal space 5 having a micro-thickness (about 5 μm) is defined by the substrates 2 and 3 and the adhesive layer 4. The adhesive layer 4 is physically discontinued at one edge portion of the cell 1 and this portion serves as an introduction port 6. The adhesive layer 4 is also physically discontinued at the opposite edge portion of the cell 1 and this portion serves as a suction port 7.

Figure 1:
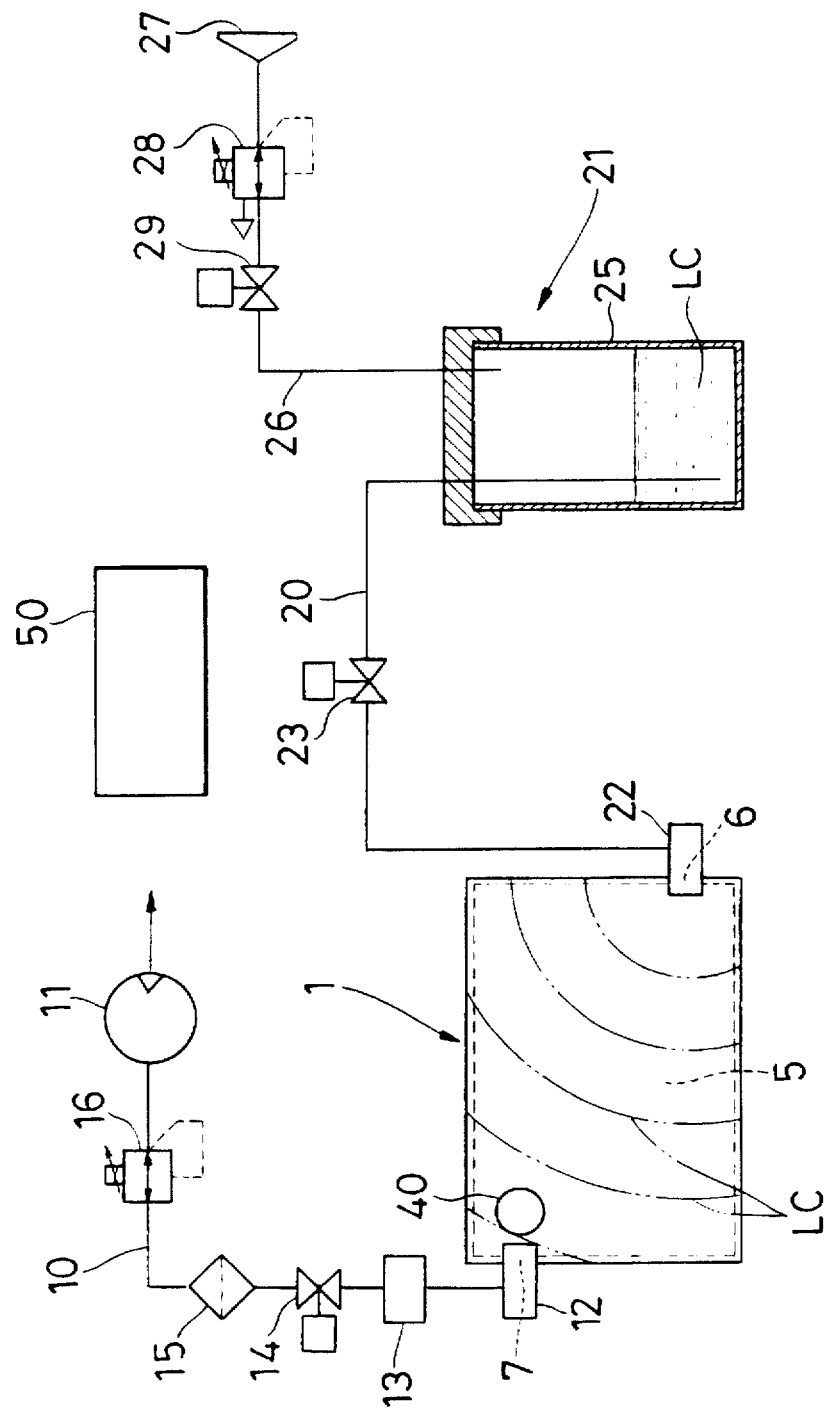
FIG. 1 is a schematic view showing a liquid crystal filling system for carrying out a process of the present invention.

As shown in FIG. 1, a liquid crystal filling system comprises a vacuum evacuation passage 10 and a liquid crystal supply passage 20 which are constituted of a pipe, a tube, or the like. The vacuum evacuation passage 10 is connected at one end (downstream end) thereof with a vacuum pump 11 (vacuum evacuation means) and at the other end (upstream end) with a connector 12. There are provided in the vacuum evacuation passage 10 between the vacuum pump 11 and the connector 12 a liquid crystal trap 13, a stop valve 14, a filter 15 and a vacuum level adjusting valve 16 (negative pressure adjusting means) in this order toward the downstream.

The liquid crystal supply passage 20 is connected at one end (upstream end) thereof with a pressurized-liquid crystal supply means 21 and at the other end (downstream end) with a connector 22. The liquid crystal supply passage 20 is provided at an intermediate portion thereof with a stop valve 23.

The pressurized-liquid crystal supply means 21 includes a tank 25 for receiving a liquid crystal LC. This tank 25 is connected with one end of the liquid crystal supply passage 20. The supply means 21 further includes a gas supply passage 26, a pressurized gas source 27 connected to one end (upstream side) of the gas supply passage 26, and a gas pressure adjusting valve 28 and a stop valve 29 which are provided in the gas supply passage 26 between the pressurized gas source 27 and the tank 25 in this order toward the downstream side. The pressurized gas source 27 stores therein such inert gas as dried nitrogen gas in its pressurized state. The gas pressure adjusting valve 28 is operated to adjust the gas pressure to a level of several times a normal atmospheric pressure and supply it into the tank 25.

The system further includes a liquid crystal sensor 40 and a control unit 50 (control means) including a micro computer. This liquid crystal sensor 40 is disposed in an area in the vicinity of the suction port 7 of the cell 1 which is set in a predetermined position.

The liquid crystal sensor 40 has a light emitting device and a light receiving device (both not shown) which are disposed on both sides of the cell 1 in such a manner as to sandwich the cell 1. Polarizing filters (not shown) are provided respectively between the light emitting device and the cell 1 and between the light receiving device and the cell 1. Polarizing surfaces of the polarizing filters forms an angle of 90 degrees with each other. In the event no liquid crystal is present between the substrates 2 and 3 of the cell 1, light from the light emitting device is shaded by the pair of polarizing filters and does not reach the light receiving device. In the event some liquid crystal is present between the substrates 2 and 3, the light from the light emitting device is allowed to pass through one of the polarizing filters and then multi-refracted during the course of passing through the liquid crystal. The multi-refracted light is partly allowed to pass through the other polarizing filter and reach the light receiving device. By this, the liquid crystal is detected.

The control unit 50 is operated to control the stop valves 14, 23 and 29, the vacuum level adjusting valve 16 and other component elements in response to a pressure gage (not shown) equipped by the system, the liquid crystal sensor 40, control buttons, etc. A process for filling the liquid crystal into the cell 1 under the control of the control unit 50 will now be described in detail.

The stop valves 14 and 23 are preliminarily closed. On the other hand, the stop valve 29 is preliminarily opened and a gas pressure is preliminarily supplied to the liquid crystal LC stored in the tank 22. The vacuum pump 11 is also preliminarily driven.

Then, the cell 1 is set to a predetermined position, the connector 12 is connected to the suction port 7 of the cell 1 and the connector 22 is connected to the introduction port 6. These connectors 12 and 22 can be connected with each other by a driving means such as air cylinder.

Then, the stop valve 14 of the vacuum evacuation passage 10 is opened. By this, air in the internal space 5 of the cell 1 is drawn through the vacuum evacuation passage 10, so that the internal space 5 is evacuated.

When the internal space 5 has reached a predetermined level of vacuum (for example, 1 Torr), that is, when the pressure gage (not shown) disposed in the vacuum evacuation passage 10 has detected the predetermined level of vacuum, the stop valve 23 of the liquid crystal supply passage 20 is opened. By this, the pressurized liquid crystal LC in the tank 25 is introduced into the internal space 5 via the liquid crystal supply passage 20, the connector 22 and the introduction port 6. The liquid crystal LC thus introduced is spread within the internal space 5 as indicated by imaginary lines of FIG. 1 and finally reaches the suction port 7 of the cell 1.

At a time point of the passage of a predetermined time after the liquid crystal sensor 40 has detected the liquid crystal LC, the stop valve 23 is closed to stop the supply of the liquid crystal LC. The timing for closing the stop valve 23 is preferably coincided with the time point when the liquid crystal LC reaches the suction port 7 of the cell 1, by properly setting the predetermined time. It is also acceptable that the timing for closing the stop valve 23 is coincided with the time point when the liquid crystal LC reaches the interior of the connector 12 or the upstream end portion of the vacuum evacuation passage 10 via the suction port 7.

At the time point when the liquid crystal LC is filled in the cell 1 and the supply of the liquid crystal LC is stopped as previously described, the liquid crystal LC is higher in pressure than the atmospheric pressure in an area in the vicinity of the introduction port 6 and a gap between the two substrates 2 and 3 constituting the cell 1 is larger than in a normal state. In contrast, in an area in the vicinity of the suction port 7 of the cell 1, the pressure of the liquid crystal LC is lower than the atmospheric pressure under the effect of vacuum evacuation and a gap between the two substrates 2 and 3 is smaller than in a normal state. The unbalance of pressure of the liquid crystal LC and the distortion of the substrates 2 and 3 are gradually resolved with the passage of time and they become almost a normal state in a little more than ten minutes as shown in FIG. 4 and return to a completely normal state in one hour.

According to the teaching of the present invention, after the completion of the liquid crystal filling operation, the vacuum level adjusting valve 16 is controlled such that the pressure in the vacuum evacuation passage 10 located on the upstream side of the vacuum level adjusting valve 16 is returned to the level of the atmospheric pressure by spending time (for example, a little more than ten minutes). More specifically, immediately after the completion of the liquid crystal filling operation, the level of negative pressure in the vacuum evacuation passage 10 is abruptly eased from 1 Torr to −750 mmHg. Thereafter, the level of the negative pressure is gradually returned from −750 mmHg to the atmospheric pressure. During this procedure, the states of connection between the connector 22 and the introduction port 6 and between the connector 12 and the suction port 7 are maintained.

After the pressure on the upstream side has been returned to the atmospheric pressure by the vacuum level adjusting valve 16 of the vacuum evacuation passage 10, the stop valve 14 is closed and the vacuum level adjusting valve 16 is returned to the original state so that the pressure on the downstream side of the stop valve 14 becomes the aforementioned level of vacuum 1 Torr.

Then, the connectors 22 and 12 are retracted from the cell 1 so as to be removed respectively from the introduction port 6 and the suction port 7. Thereafter, the cell 1 is removed from the predetermined position to set a new cell. The introduction port 6 and the suction port 7 of the removed cell 1 are rapidly sealed with an adhesive agent and hardened by ultraviolet ray. A liquid crystal is then filled into the new cell in the same manner as described.

In the above-mentioned process, after the completion of the liquid crystal filling operation, the pressure in the vacuum evacuation passage 10 is not returned abruptly to the atmospheric pressure but it is gradually returned to the atmospheric pressure spending time in a way as corresponding to the procedures for resolving the pressure unbalance of the liquid crystal LC in the cell 1 and for resolving the distortion of the substrates 2 and 3. Accordingly, air can be prevented from entering the cell 1 from the suction port 7.

Since the vacuum evacuation passage 10 is not maintained in a high level of vacuum state after the completion of the liquid crystal filling operation, resolving of the pressure unbalance of the liquid crystal LC and resolving of the distortion of the substrates 2 and 3 are not delayed and leak of the liquid crystal LC from the suction port 7 can be restrained. Especially, since the level of negative pressure in the vacuum evacuation passage 10 is abruptly eased from 1 Torr to −750 mmHg in the above-mentioned mode of operation, leak of the liquid crystal LC can be minimized. Even if the negative pressure in the vacuum evacuation passage 10 is eased to the approximate level of −750 mmHg immediately after the completion of the liquid crystal filling operation, entry of air is hardly taken place.

Since the connector 22 is held connected to the introduction port 6 during the process of the easing the pressure in the vacuum evacuation passage 10, leak of the liquid crystal from the introduction port 6 can be eliminated.

The present invention is not limited to the above-mentioned modes for operation, but many changes can be made. For example, instead of easing the pressure in the vacuum evacuation passage 10 abruptly to the predetermined level immediately after the liquid crystal filling operation has been finished, the level of vacuum may gradually be eased from the high vacuum state.

What is claimed is:

1. A process for filling a liquid crystal cell comprising the steps to be performed in the following order of:

(a) connecting one end of a vacuum evacuation passage to a suction port of the cell and connecting one end of a liquid crystal supply passage to an introduction port of said cell;

(b) evacuating an internal space of said cell by vacuum evacuation means connected to the other end of said vacuum evacuation passage through said suction port;

(c) supplying a pressurized liquid crystal to the internal space of said cell by a pressurized-liquid crystal supply passage through said introduction port of said cell while evacuating the internal space of said cell by said vacuum evacuation means;

(d) stopping a supply of the pressurized liquid crystal after the completion of a liquid crystal filling operation into the internal space of said cell; and (e) after stopping the supply of the pressurized liquid crystal, gradually easing the level of negative pressure in said vacuum evacuation passage to that of an atmospheric pressure by a negative pressure adjusting means which is disposed in said vacuum evacuation passage while maintaining the state of connection of said vacuum evacuation passage with said suction port of said cell and the state of connection of said liquid crystal supply passage with said introduction port of said cell.

2. A process for filling a liquid crystal cell according to claim 1, further comprising the steps of:

detecting the pressurized liquid crystal in said cell by a liquid crystal sensor disposed in an area of said suction port; and performing the step of stopping a supply of the pressurized liquid crystal at a time after the liquid crystal sensor has detected the pressurized liquid crystal.

3. A process for filling a liquid crystal cell according to claim 1, in which the negative pressure in said vacuum evacuation passage is abruptly eased to a predetermined level and then gradually eased to a level of the atmospheric pressure.

4. A process for filling a liquid crystal cell according to claim 1, wherein the supply of the pressurized liquid crystal is performed by opening a valve mounted on the liquid crystal supply passage and the supply of the pressurized liquid crystal is stopped by closing the valve.

* * * * *